3,429,958
METHOD OF PREPARING CARBON BLACK-WAX PELLETS

Van R. Walcott, Jr., Houston, Tex., assignor to Continental Carbon Company, Houston, Tex., a corporation of Delaware
No Drawing. Filed July 28, 1966, Ser. No. 568,392
U.S. Cl. 264—117                                    3 Claims
Int. Cl. C09c 1/58

This invention relates to a method for preparing small, generally spherical, free-flowing pellets from a mixture of impalpable carbon black and molten paraffin wax, and to the resultant pelletized product as a new article of manufacture having utility in a variety of end use applications, especially in the formulation of carbon paper and news inks.

Carbon black as initially produced by conventional methods involving the dissociation or cracking of hydrocarbons, i.e., either the furance, thermal or impingement process, is an extremely light, finely divided, bulky material. While the apparent density of carbon black can be increased moderately by a simple deaeration process, the extent of such increase does not result in a product which can be conveniently handled in the various applications in which carbon black is employed nor does it result in a product which can be economically transported.

It is well known that the apparent density of carbon black can be advantageously increased by converting the impalpable form of the black into comparatively small, generally spherical and relatively dense beads or pellets thereof. The preparation of beaded or pelleted carbon black of sufficient structural stability so that it can be transported in this form and yet will remain in a substantially dustless condition after considerable handling is also well known. The physical structure of pelletized carbon black, however, is such that the pellets can be broken up in the various applications in which carbon black is utilized as either a reinforcing filler or pigment.

One of the most effective ways of pelletizing carbon black consists of violently agitating the black in the presence of a polar wetting agent, usually water, in a stationary enclosed vessel having a configuration generally of that of an elongated cylinder. In accordance with this "wet" procedure, the requisite agitating or beating action is obtained by rapidly rotating a centrally mounted shaft within the cylindrical chamber, said shaft having a plurality of closely spaced pins radially extending therefrom and terminating proximately adjacent to the wall of chamber.

There are several disadvantages of a pelleted carbon black product prepared by the wet process, particularly when the product is used as a pigment in ink or coating applications. In order to prepare a satisfactorily stable carbon black pellet, it is for all practical purposes necessary to incorporate an extraneous material called a binder. If a binder is not employed, the carbon black pellets will not withstand much handling and in the transportation thereof a considerable amount of the pellets will break up to yield a comparatively dusty product. The most effective binders used in the production of carbon black pellets are represented by a number of carbohydrate substances, with dilute molasses solution being generally preferred for this purpose. After the formation of the carbon black pellets, they are then dried and heated to a temperature capable of carbonizing the molasses content. It is especially difficult to carbonize the binder completely and consequently, quite frequently odor problems arise in the subsequent use of such pelleted products in the formulation of coating materials. Carbon black pellets made using a binder are also difficult to incorporate in a coating or ink formulation. In order to properly incorporate the carbon black into such formulations, it is necessary to break down the carbon black pellet to individual particles having a size in the order of a micron or less. Carbon black is inherently difficult to wet and disperse and, therefore, the more stable the carbon black pellet is, the more difficult is the task of accomplishing proper wetting and dispersion.

In accordance with this invention, a process is provided for preparing free-flowing dense pellets of a mixture of pulverulent carbon black and paraffin wax having a nominal diameter of 0.1 inch or less wherein the carbon black particles are substantially homogeneously distributed throughout the wax phase. This improved method utilizes a pelletizer of the type generally described hereinabove. No water or other polar type wetting agent is required in the instant process. Rather, molten paraffin wax serves to facilitate the formation of the beads in much the same manner as the wetting agent used in the conventional method. Unlike in the conventional wet processes, the need of a binder additive is obviated since the resultant pellets of carbon black and paraffin wax are characterized in having a structural stability superior to that of the prior art pelletized products. Another advantage of the products of this invention is that they can be much more readily incorporated in a coating composition or ink, such as a carbon paper or a news ink, without observing the lengthy grinding times normally required to incorporate the prior art pellets in said formulations. Since paraffin wax is employed as a vehicle component in a substantial number of coating and ink formulations the pelletized products of this invention are ideally suited for use in this application.

Broadly stated, my novel process involves violently agitating carbon black powder in a conventional, horizontally disposed enclosed pin-type pelletizer while introducing thereinto paraffin wax in a molten form. Introduction of the paraffin wax can be accomplished in several ways. The preferred mode of introduction, however, is one whereby the molten paraffin wax is atomized and sprayed into the pelletizer at several points along the length thereof. The amount of paraffin wax needed to result in the formation of pellets depends mainly upon the particular type of carbon black used. Further details concerning this aspect of the practice of this invention will be given hereinbelow. Upon introduction of an adequate amount of the paraffin wax to the pelletizer, the time required to accomplish bead formation is ordinarily brief and seldom exceeds 10 to 15 minutes pelletizing time. The applicable rotational speeds, as well as the spacing of the pins and clearance thereof with respect to the wall of the pelletizer, all conform to standard practices observed in the wet pelletizing art.

After the formation of the beads, the contents of the pelletizer are discharged and cooled to provide free-flowing, dustless pellets. The above-described batch procedure represents the preferred method of operation. It is possible, however, to carry out the manufacture of the pelletized mixtures of paraffin wax and carbon black by means of a continuous procedure.

The paraffin wax contemplated as useful in preparing the instant pelletized products includes all of the wax constituents occurring in the various fractions of a crude petroleum oil. Representative of such waxes are the highly refined type of paraffin wax and the lower melting crude and slack waxes. Additionally applicable are the microcrystalline waxes and mixtures thereof with the aforementioned paraffin waxes. While the matrix portion of the products of this invention is advantageously one of the foregoing waxes or mixtures thereof, it is obvious that such can be further modified with other mineral waxes, e.g., montan, or any of the vegetable, insect and synthetically derived waxes for the purpose of preparing specialty products for the trade.

All of the carbon blacks, whether produced by the impingement, thermal or furnace process, can be converted into pelletized products by the practice of this invention. The products of the enumerated processes include the various grades of channel black and the numerous grades of furnace blacks, such as for example, the abrasion-resistant, rubber-grade furnace blacks as well as the general processing, medium processing and semi-reinforcing grades of this class of carbon blacks. Likewise, the thermal blacks such as represented by the medium grade thermal and fine grade thermal varieties are applicable. The furnace blacks, and in particular the abrasion-resistant, rubber-grade types such as SAF, ISAF and HAF, are especially suitable for preparing a pelletized product.

The amount of paraffin wax needed to yield satisfactory pellets depends largely on the particular grade of carbon black employed. For example, channel blacks require the highest amount of paraffin wax, thermal blacks the lowest, whereas the furnace blacks are intermediate in their behavior in this respect. An optimum ratio of carbon black to wax is in the order of about 30:70, respectively, for the channel blacks; 50:50, respectively, for the furnace blacks and 25:75, respectively, for the thermal blacks.

In the practice of the present invention it is preferred that the carbon black exist at a moderately elevated temperature prior to the addition of the wax. This can be most conveniently accomplished by charging carbon black at a temperature of from about 130–240° F. to the pelletizer.

The following example of a manner for carrying out my process is presented for illustrative purposes and not by way of limitation.

EXAMPLE

In this example, a laboratory model of a pin-type pelletizer of standard design was employed. The pelletizer consisted of a metallic stationary cylinder 19 inches in length and 12 inches in diameter enclosing a centrally mounted rotatable shaft having 20 equi-spaced pins (½″ OD) mounted thereon, the tips of which terminated at about 9/16 inch from the wall of the cylinder. The shaft was driven by a variable speed drive mechanism adapted to maintain a desired rate of revolutions. The wax injection system consisted of three horizontally spaced spray heads communicating with the interior of the pelletizer each of which was connected to a heated reservoir of wax. Carbon black (HAF) in the amount of 1816 grams was charged to the pelletizer and heated therein to a temperature of 150° F. Heating was accomplished by means of three strip heaters attached to the exterior of the pelletizer. Fully refined paraffin wax (M.P. 130–132° F.) in the amount of 1486 grams and at a temperature of 150° F. was sprayed into the pelletizer. A constant r.p.m. rate of 500 was observed. Further details with regard to this run are as follows:

| | Minutes |
|---|---|
| Wax sprayed at uniform rate | 0–3 |
| Small pills commenced forming | 4 |
| R.p.m. rate dropped | 9 |
| Run stopped—contents discharged | 10 |

The product of the above run upon cooling was composed essentially completely of small, free-flowing pills. The resultant pellets were incorporated into a standard newspaper ink formulation by ball milling same along with other components including a substantial amount of a paraffinic ink oil. For comparison, an identical ink formulation was prepared utilizing the same grade of carbon black, except that the black existed initially in the form of conventional pellets. The latter comparative test ink requires about 100% longer grinding time to achieve the same degree of pigment dispersion as exhibited by the ink sample prepared using the carbon black/wax pellets of this example.

I claim:
1. A process for forming small generally spherical pellets of a mixture of impalpable carbon black and paraffin wax which comprises violently agitating the carbon black in an enclosed pin-type pelletizer while introducing thereinto molten paraffin wax in an amount sufficent to provide pellets having a weight ratio of carbon black to wax of from about 50:50 to 30:70, respectively.

2. A process in accordance with claim 1 wherein the wax is introduced as an atomized spray.

3. A process in accordance with claim 2 wherein the carbon black is at a temperature between about 130 and 240° F. prior to the introduction of said wax.

References Cited

UNITED STATES PATENTS

| 2,942,299 | 6/1960 | Larson | 264—117 |
| 3,005,725 | 10/1961 | Daniell | 264—117 |
| 3,326,642 | 6/1967 | Ruble | 264—117 |

ROBERT F. WHITE, *Primary Examiner.*

J. R. HALL, *Assistant Examiner.*